United States Patent [19]
Capobianco

[11] Patent Number: 6,032,964
[45] Date of Patent: Mar. 7, 2000

[54] KAYAK TRANSPORT DEVICE

[75] Inventor: Benedetto S. Capobianco, West Paterson, N.J.

[73] Assignee: Fred Schreib, Lodi, N.J.; a part interest

[21] Appl. No.: 09/336,565

[22] Filed: Jun. 21, 1999

[51] Int. Cl.⁷ ...................................................... B62B 1/04
[52] U.S. Cl. .................................... 280/47.331; 280/414.2
[58] Field of Search ............................... 280/47.331, 638, 280/639, 651, 414.1, 652, 414.2, 47.131, 63; 114/347

[56] References Cited

U.S. PATENT DOCUMENTS

| | | | |
|---|---|---|---|
| 3,986,723 | 10/1976 | Brockelsby | 280/47.331 |
| 4,392,665 | 7/1983 | Miller et al. | 280/414.2 |
| 4,602,802 | 7/1986 | Morgan | 280/47.331 |
| 4,706,983 | 11/1987 | Griswold | 280/47.331 |
| 4,824,127 | 4/1989 | Stamm | 280/47.331 |
| 4,830,387 | 5/1989 | Batter | 280/47.331 |
| 5,261,680 | 11/1993 | Freitag | 280/47.331 |
| 5,779,250 | 7/1998 | Becht | 280/47.331 |
| 5,791,279 | 8/1998 | Hart | 280/47.131 |

Primary Examiner—Richard M. Camby
Attorney, Agent, or Firm—Ezra Sutton

[57] ABSTRACT

A kayak transport device for transporting a kayak, the kayak having a hull with a pair of existing hull apertures for mounting the kayak on the kayak transport device. The kayak transport device includes a substantially H-shaped transport frame member having first and second vertical frame members, and an adjustable crossbar assembly. The crossbar assembly includes first and second crossbars being adjustable relative to each other, the first and second crossbars being connected to the first and second vertical frame members, respectively. The crossbar assembly being adjustable for adjusting the spacing between the first and second vertical frame member to correspond to the distance between the hull apertures on the kayak hull. The first and second vertical frame members include first and second upper strut members, respectively, having upper strut ends for insertion within each of the hull apertures of the kayak hull for mounting the kayak on the kayak transport device. The first and second vertical frame members also include first and second curved lower strut members, respectively, having a wheel member connected to each of the lower strut members.

10 Claims, 4 Drawing Sheets

KAYAK TRANSPORT DEVICE

FIELD OF THE INVENTION

This invention relates to a kayak transport device for transporting a kayak on land and into water. More particularly, the kayak transport device includes an H-shaped frame member having a pair of wheels and pair of curved poles extending upwardly and through existing holes in the kayak hull for mounting the kayak on the kayak transport device.

BACKGROUND OF THE INVENTION

Small recreational watercraft such as kayaks, canoes, small boats, dinghies, zodiacs and the like use portable and detachable transport systems for the transportation of the watercraft on highways and roads to a water area for launching of the watercraft, as well as, the recovery of the watercraft from that water area after use has been completed. Typically, these transport systems have only intermittent use as they are constructed for long haul transporting on roads and are not usually suited for portage usage. Kayaking, canoeing and rowing shells often require portage over beach sand or rough terrain, and sometimes the vessel is loaded with camping gear and/or watercraft gear. This portage can be very difficult and tiresome for transporting the water craft over the rough terrain or beach sand to a water area (river, lake, pond, stream, ocean and the like) and can be virtually impossible for a single individual. As these transport systems are typically used for long haul transporting and not normally used for manually transporting the watercraft to the water area, these transport systems are heavy, complicated, and expensive.

There remains a need for a kayak transport device that is particularly suited for manually transporting a kayak a short distance over rough terrain or beach sand to a water area by a single individual. Additionally, the kayak transport device should have easy access for loading and unloading the kayak to and from the transport device. The kayak transport device should also be light-weight, adjustable, and collapsible for easy storage.

DESCRIPTION OF THE PRIOR ART

Watercraft transporting devices, boat dollies, boat wheel systems and portage transport devices having various designs, configurations, structures and materials of construction have been disclosed in the prior art. For example, U.S. Pat. No. 3,986,723 to BROCKELSBY discloses a removable boat wheel system for facilitating transportation of a boat on land. Each of the wheel assemblies includes a strut with a pivot shaft and a support arm. Each wheel assembly is coupled to the boat hull through an aperture in one side of the hull and a second aperture in the other side of the hull. The pivot shaft is inserted in the sleeve through each aperture, while the ends of the support arms are inserted into the boat hull apertures. This prior art patent does not disclose or teach the structure of the present invention.

U.S. Pat. No. 5,791,279 to HART discloses an apparatus for transporting a canoe to water from land using a dual-wheeled dolly with a cradle. The canoe sits in the cradle while tensioning straps secure the canoe to the dolly. This prior art patent does disclose or teach the structure of the present invention.

U.S. Pat. No. 4,936,595 to CUNNINGHAM discloses a canoe toter for transporting a canoe or small marine craft. A pair of wheels are rotatably mounted on opposite ends of an adjustable width axle. The canoe can be tightened against the axle by means of nuts and bolts, and being rotated downwardly around the bolts. The width of the axles are adjustable to accommodate various boat or canoe sizes. This prior art patent does not disclose or teach the structure of the present invention.

U.S. Pat. No. 4,830,387 to BATTEN discloses a boat carrier. The carrier is connected to the boat by a pair of bolts which extend upwardly through oar lock holes formed in the gunwales of the boat. By tightening the crank nuts, the boat is lifted off the ground. A transverse member runs along the horizontal width of the boat. This prior art patent does not disclose or teach the structure of the present invention.

U.S. Pat. No. 4,824,127 to STAMM shows a support carriage with wheels for transporting a canoe. The canoe is secured to the carriage with straps. The straps are secured through rings that are connected to the support carriage. This prior art patent does not disclose or teach the structure of the present invention.

U.S. Pat. No. 4,392,665 to MILLER discloses a boat dolly for supporting the stern of a boat. The bow of the boat rests on a pair of ropes which are tied to the frame of the dolly. The hull of the boat rests on a pair of rails. Also included are a pair of rear struts that are pivotally mounted to the frame. The struts have clamps which are attached at the top thereof for attaching to the top edge of the rear portion of a boat. This prior art patent does not disclose or teach the structure of the present invention.

None of the aforementioned prior art patents teach or disclose a kayak transport device having a pair of curved poles that extend upwardly and through holes in the kayak hull for connecting the kayak to the kayak transport device as shown in the present invention.

Accordingly, it is an object of the present invention to provide a kayak transport device for transporting a kayak on land and into water which can be used by a single person.

Another object of the present invention is to provide a kayak transport device that allows for manually transporting a kayak and the transport device a short distance over rough terrain or beach sand to a water area by a single individual.

Another object of the present invention is to provide a kayak transport device that has a pair of light-weight wheels, and a pair of curved poles that extend upwardly and through holes in the kayak hull for connecting the kayak to the kayak transport device for easy mounting and securing the kayak to the transport device.

Another object of the present invention is to provide a kayak transport device that has easy access and maneuverability for loading and unloading the kayak to and from the transport device.

Another object of the present invention is to provide a kayak transport device that is adjustable for various sizes of kayak hulls.

Another object of the present invention is to provide a kayak transport device that is collapsible for easy storage.

Another object of the present invention is to provide a kayak transport device that is durable, non-breakable, light-weight and easy to install, transport and remove when in operational use.

A further object of the present invention is to provide a kayak transport device that can be mass produced in an automated and economical manner and is readily affordable by the user.

SUMMARY OF THE INVENTION

In accordance with the present invention, there is provided a kayak transport device for transporting a kayak, the kayak having a hull with a pair of existing hull apertures for mounting the kayak on the kayak transport device. The kayak transport device includes a substantially H-shaped transport frame member having first and second vertical frame members, and an adjustable crossbar assembly. The crossbar assembly includes first and second crossbars being adjustable relative to each other, the first and second crossbars being connected to the first and second vertical frame members, respectively. The crossbar assembly being adjustable for adjusting the spacing between the first and second vertical frame members to correspond to the distance between the hull apertures on the kayak hull. The first and second vertical frame members include first and second upper strut members, respectively, having upper strut ends for insertion within each of the hull apertures of the kayak hull for mounting the kayak on the kayak transport device. The first and second vertical frame members also include first and second curved lower strut members, respectively, having a wheel member connected to each of the lower strut members.

BRIEF DESCRIPTION OF THE DRAWINGS

Further objects, features and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
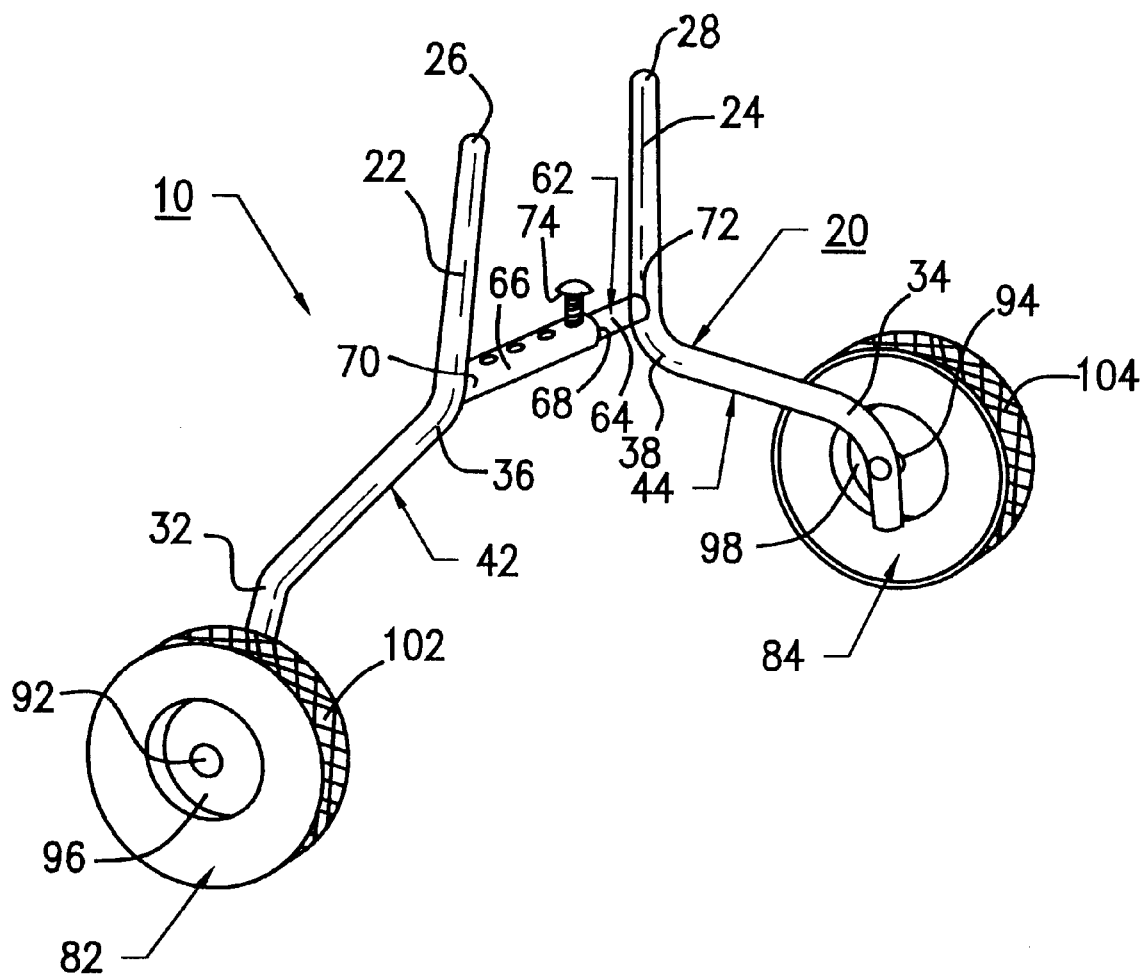
FIG. 1 is a perspective view of the kayak transport device of the preferred embodiment of the present invention showing the kayak transport device and its component parts in an assembled state ready for operational use.
Figure 2:
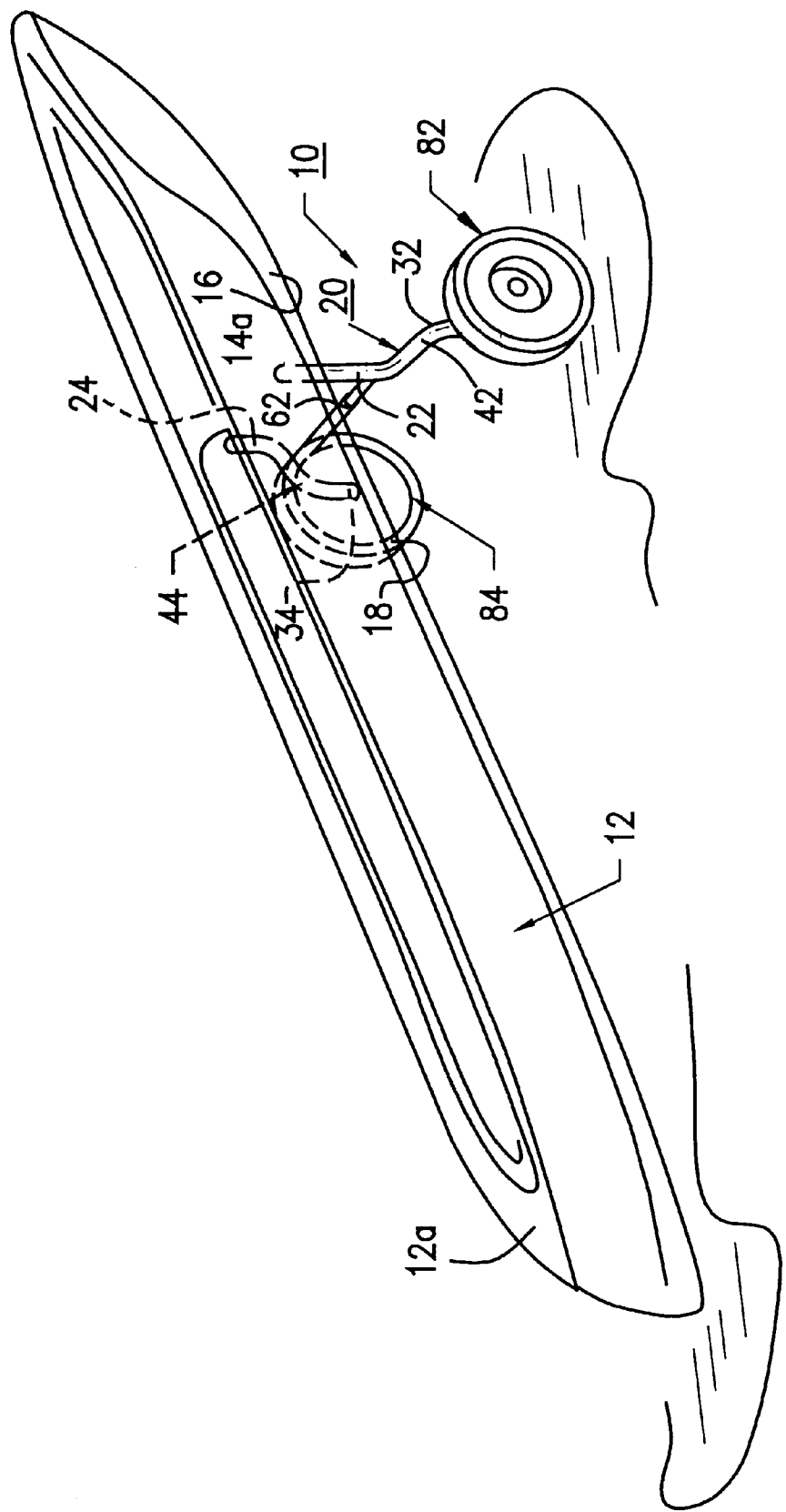
FIG. 2 is a perspective view of the kayak transport device of the present invention showing the kayak transport device in an assembled state with a kayak mounted thereon and in operational use thereof.
Figure 3:
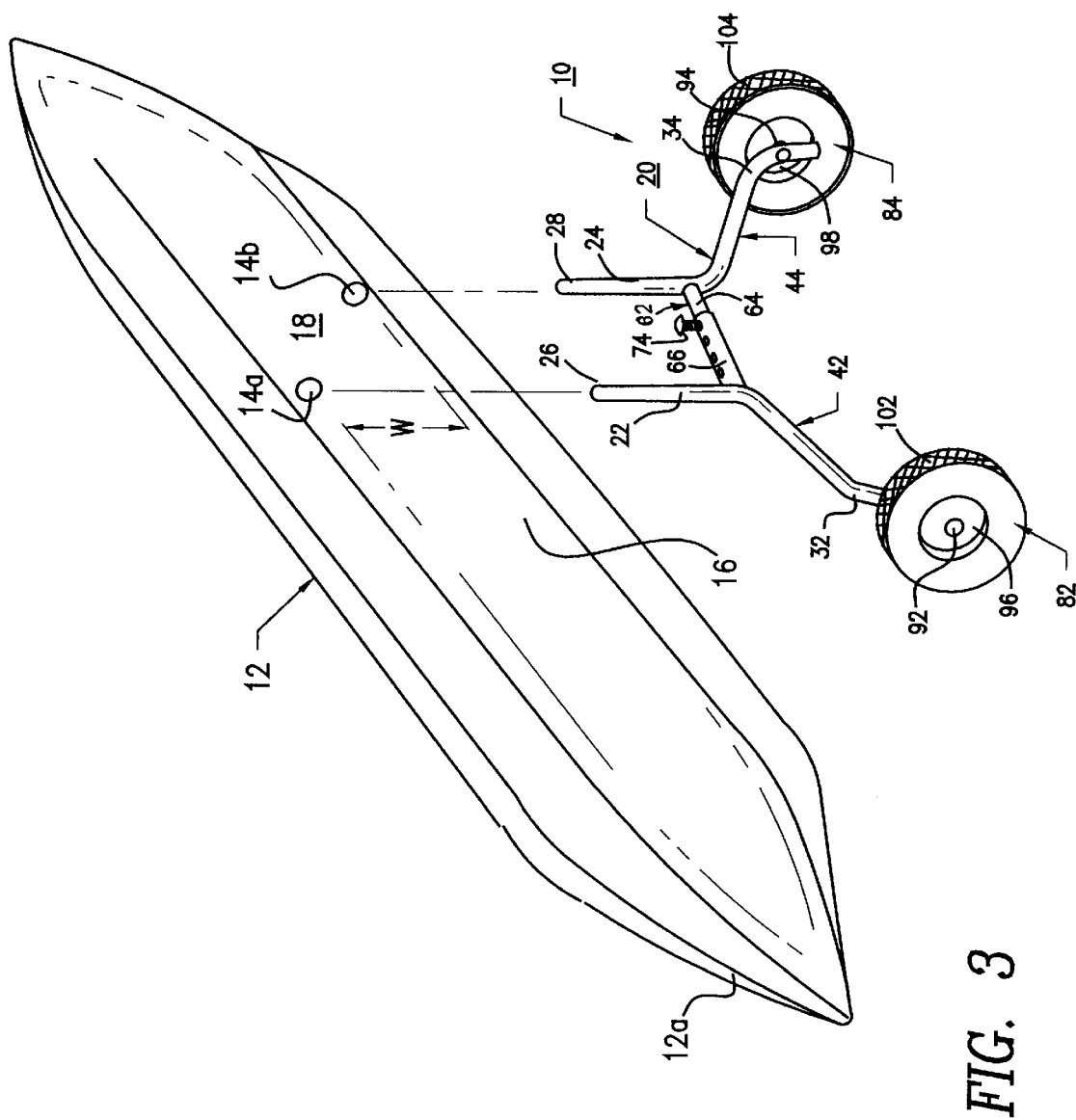
FIG. 3 is a perspective view of the kayak transport device of the present invention showing the upper strut ends of the upper strut members inserted within the hull apertures on the bottom section of the kayak hull.

The kayak transport device 10 and its component parts of the preferred embodiment of the present invention are represented in detail by FIGS. 1 through 4 of the patent drawings. The kayak transport device 10 is used for transporting a kayak 12 on land and into a water area such as a river, stream, pond, lake, bay, ocean or the like. The kayak transport device 10 includes a light-weight transport frame member 20 being substantially H-shaped having first and second vertical frame members 42 and 44 including first and second upper strut members 22 and 24 with upper strut ends 26 and 28, respectively. Upper strut ends 26 and 28 extend upwardly and are received within a pair of hull apertures 14a and 14b located within the hull 16 of the kayak 12, as shown in FIGS. 2 and 3 of the patent drawings.

Figure 4:
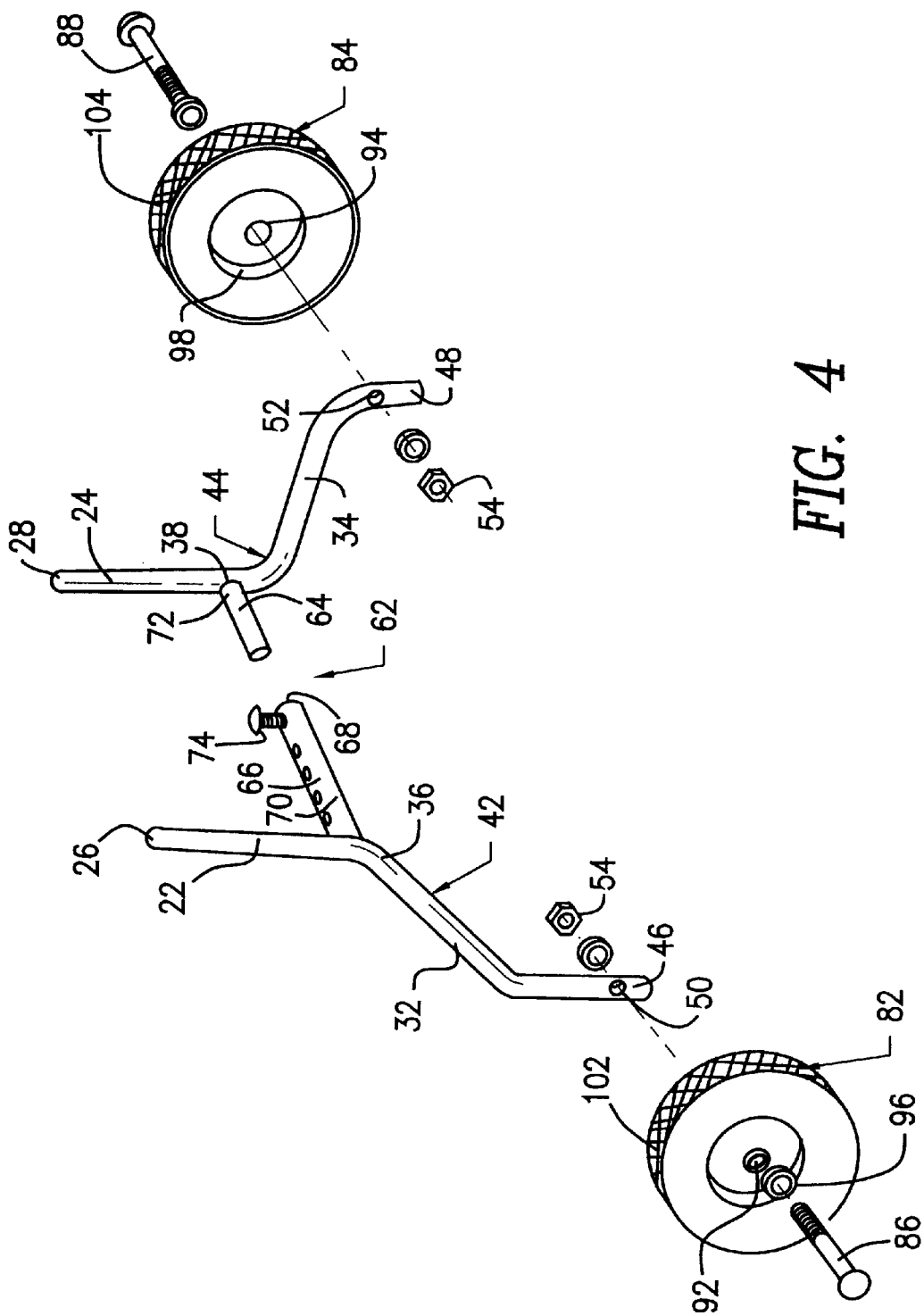
FIG. 4 is a perspective view of the kayak transport device of the present invention showing the transport device in a disassembled state having two separate vertical frame members each having a wheel member attached thereto.

H-shaped frame member 20 also includes a pair of curved lower strut members 32 and 34 having a pair of wheel members 82 and 84 attached thereto. Additionally, H-shaped frame member 20 includes a telescoping crossbar assembly 62 having a first insert crossbar 64 and a second receiving crossbar 66 having a receiving opening 68 formed therein, as depicted in FIG. 4 of the patent drawings. First insert crossbar 64 is received within the receiving opening 68 of the second receiving crossbar 66 to provide a telescoping crossbar assembly 62 for adjusting the length of crossbar assembly 62 to accommodate hulls 16 having different widths. Telescoping crossbar assembly 62 is attached at each end 70 and 72 to connecting points 36 and 38 on the lower strut members 32 and 34, respectively, as shown in FIGS. 3 and 4 of the patent drawings. Ends 70 and 72 are attached by welding, gluing or fastening by nuts and bolts. Once crossbars 64 and 66 are adjusted, they are held in position by a locking screw and nut 74.

The lower strut members 32 and 34 include lower strut ends 46 and 48 having axle openings 50 and 52 therein. Wheel axles 86 and 88 of wheel members 82 and 84 are received within axle openings 50 and 52, respectively. Axle openings 50 and 52 receive each of the axles 86 and 88 therein for mounting and securing the wheel axles 86 and 88 to each of the lower strut ends 46 and 48 of the lower strut members 32 and 34, respectively, and being secured by nuts 54, as depicted in FIGS. 1 and 4 of the drawings.

The vertical frame members 42 and 44 of the transport frame member 20 are made of light-weight, durable, rigid plastic tubing or are made of light-weight durable metals such as aluminum or stainless steel tubing. Plastic tubing has a diameter in the range of ¾" to 1½". Metal tubing has a diameter in the range of ¾" to 1¼". H-shaped frame member 20 has a height measurement in the range of 15" to 30" (without wheel members 82 and 84 being attached) and a width measurement in the range of 30" to 39".

Wheel members 82 and 84 include wheel axles 86 and 88, wheel axle hubs 92 and 94, wheel rims 96 and 98, and tires 102 and 104 thereon, as shown in FIGS. 3 and 4 of the patent drawings. Wheel members 82 and 84 are specifically designed for manually transporting of the kayak 12 short distances on rough terrain or sand. Tires 102 and 104 are in the form of low speed pneumatic rubber tires or plastic sand tires for maneuvering over rough terrain or sandy beach.

OPERATION OF THE INVENTION

In operating the kayak transport device 10 of the present invention, the user's first step is to simply adjust the telescoping crossbar assembly 62 to the proper width W, being the distance between the first and second hull apertures 14a and 14b on the kayak hull 16, as shown in FIG. 3 of the drawings. The user then locks the telescoping crossbar assembly 62 in place by locking means 74, such as setscrew, where then the length of the crossbar assembly 62 does not change during operation. Next, the user inserts the upper strut ends 26 and 28 within the hull apertures 14a and 14b, respectively, such that the bottom section 18 of the kayak hull 16 is in contact with and resting on telescoping crossbar assembly 62, as depicted in FIG. 2 of the drawings. The user then lifts the other end 12a of kayak 12 for transporting it to a water area.

To unload the kayak 12 from the kayak transport device 10, the user simply lifts the bottom section 18 of the kayak hull 16 off of crossbar assembly 62 so that the upper strut ends 26 and 28 are removed from hull apertures 14a and 14b. Then the user removes the kayak transport device 10 from kayak 12.

When the kayak transport device is no longer needed, the user simply unlocks locking means 74 of crossbar assembly 62 to disassemble the transport member 20 into two separate vertical frame members 42 and 44, respectively, as shown in FIG. 4 of the drawings. The user can then easily clean and store away the vertical frame members 42 and 44 having the wheel members 82 and 84 attached or unattached, as desired.

ADVANTAGES OF THE PRESENT INVENTION

Accordingly, an advantage of the present invention is that it provides for a kayak transport device for transporting a kayak on land and into water which can be used by a single person.

Another advantage of the present invention is that it provides for a kayak transport device that allows for manually transporting of a kayak and the transport device a short distance over rough terrain or beach sand to a water area by a single individual.

Another advantage of the present invention is that it provides for a kayak transport device that has a pair of light-weight wheels, and a pair of curved poles that extend upwardly and through holes in the kayak hull for connecting the kayak to the kayak transport device for easy mounting and securing the kayak to the transport device.

Another advantage of the present invention is that it provides for a kayak transport device that has easy access and maneuverability for loading and unloading the kayak to and from the transport device.

Another advantage of the present invention is that it provides for a kayak transport device that is adjustable for various sizes of kayak hulls.

Another advantage of the present invention is that it provides for a kayak transport device that is collapsible for easy storage.

Another advantage of the present invention is that it provides for a kayak transport device that is durable, non-breakable, light-weight and easy to install, transport and remove when in operational use.

A further advantage of the present invention is that it provides for a kayak transport device that can be mass produced in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A kayak transport device for transporting a kayak, the kayak having a hull with a pair of existing hull apertures for mounting the kayak on said kayak transport device, comprising:

a) a substantially H-shaped transport frame member having first and second vertical frame members and an adjustable crossbar assembly;

b) said crossbar assembly including first and second crossbars being adjustable relative to each other, said first and second crossbars being connected to said first and second vertical frame members, respectively; said crossbar assembly being adjustable for adjusting the spacing between said first and second vertical frame members to correspond to the distance between the hull apertures on the kayak hull;

c) said first and second vertical frame members including first and second upper strut members, respectively, having upper strut ends for insertion within each of the hull apertures of the kayak hull for mounting the kayak on said kayak transport device;

d) said first and second vertical frame members including first and second curved lower strut members, respectively; and e) a wheel member connected to each of said lower strut members.

2. A kayak transport device in accordance with claim 1, wherein said first and second crossbars are attached to each of said first and second vertical frame members, respectively, by attachment means located on each of said first and second vertical frame members.

3. A kayak transport device in accordance with claim 2, wherein said attachment means include welding, gluing, or fastening by nuts and bolts of said first and second crossbars to said first and second vertical frame members.

4. A kayak transport device in accordance with claim 1, wherein each of said first and second curved lower strut members include a lower strut end for attaching to each of said wheel members.

5. A kayak transport device in accordance with claim 1, wherein said H-shaped transport frame member is made of light-weight, durable, rigid plastic tubing having a diameter in the range of ¾" to 1½".

6. A kayak transport device in accordance with claim 1, wherein said H-shaped transport frame member is made of light-weight, durable metals such as aluminum or stainless tubing having a diameter in the range of ¾" to 1¼".

7. A kayak transport device in accordance with claim 1, wherein each of said wheel members includes a wheel axle, a wheel axle hub, a wheel rim and a tire thereon.

8. A kayak transport device in accordance with claim 7, wherein said wheel axles are connected to said lower strut ends for connecting said wheel members to each of said lower strut members.

9. A kayak transport device in accordance with claim 1, wherein said H-shaped transport frame member has a height in the range of 15" to 30" and width in the range of 30" to 39".

10. A kayak transport device in accordance with claim 7, wherein said tires are low speed pneumatic rubber tires or plastic sand tires for maneuvering over rough terrain.

* * * * *